OR    3,938,881

United States P[atent]    3,938,881
Biegelsen et al.    Feb. 17, 1976

[54] ACOUSTO-OPTIC MODULATION DEVICE

[75] Inventors: David K. Biegelsen, Woodside; Gary K. Starkweather, Saratoga; James C. Zesch, Mountainview, all of Calif.

[73] Assignee: Xerox Corporation, Stamford, Conn.

[22] Filed: Nov. 25, 1974

[21] Appl. No.: 526,493

[52] U.S. Cl. ............... 350/161; 29/594; 264/1; 310/9.1
[51] Int. Cl.² ............ G02F 1/33; G02F 1/11
[58] Field of Search ......... 350/161, DIG. 2; 29/25, 29/35, 594; 310/8.1, 8.3, 9.1; 264/1, 239

[56] References Cited
OTHER PUBLICATIONS
Aviram et al., Multi–monomolecular Film Material for Acoustic and Optical Devices, IBM Technical Disclosure Bull., Vol. 14, No. 1, June 1971, pp. 290–292.

*Primary Examiner*—Archie R. Borchelt
*Assistant Examiner*—E. R. LaRoche
*Attorney, Agent, or Firm*—J. E. Beck; T. J. Anderson; Leonard Zalman

[57] ABSTRACT

An acousto-optic modulation device is provided which is comprised of an interaction material of an injection moulded plastic integrally combined with a transducer which is bonded automatically to the interaction material during the injection process. A beam of light is projected through the interaction material, the light being diffracted by an acoustic field established by the transducer.

17 Claims, 5 Drawing Figures

ACOUSTO-OPTIC MODULATION DEVICE

BACKGROUND OF THE INVENTION

The present invention relates to acousto-optic devices and a method of making one. More particularly, the invention provides for such a device which has an associated transducer bonded integrally with it.

Acousto-optic devices usually comprise an electrically driven piezoelectric transducer bonded to an acousto-optic medium. The medium material generally applied is a high refractive index material, such as telluride glass. Such devices have applications as light deflectors in optical memories, acoustic delay lines, acoustic switches, and light modulators. An acoustic strain wave provided by the transducer modulates the refractive index of the medium which in turn diffracts light in a preferred direction when light incident on the medium is near the Bragg angle. The medium acts as a grating, the grating period being equal to the wavelength of the sound in the medium.

Since the amount of sound which enters the acousto-optic medium depends on the quality of the bond between the transducer and the acousto-optic medium, the bond is important. U.S. Pat. No. 3,798,746 to Alphonse, issued Mar. 26, 1974, teaches that the bond between the transducer and the acousto-optic medium can be improved by following certain process steps and utilizing special metals as primer metals.

It is an object of the present invention to provide a natural bond between an acousto-optic medium and its associated transducer.

It is yet another object of the present invention to provide an acousto-optic device which has as the interaction material an injection moulded plastic with a transducer integrally bonded to it.

Other objects of the invention will be evident from the description hereinafter presented.

SUMMARY OF THE INVENTION

The invention relates to an acousto-optic device which is comprised of an acousto-optic medium of an injection moulded plastic for the interaction material and a transducer which is integrally bonded with the medium. An acoustic strain wave generated by the transducer modulates the refractive index of the medium which in turn diffracts light incident upon the medium in a preferred direction when the angle of incidence is near the Bragg angle.

The device is fabricated by first laying the transducer element in a mould which is configured to provide the desired shape of the acousto-optic medium. Moulten plastic is injected through an aperture in the mould where upon cooling, the transducer is integrally bonded with the acousto-optic medium and the medium has the desired optical configuration.

Another feature of the invention is that a heat sink may be provided which is bonded to the acousto-optic medium during injection moulding. Prior to injection of the moulten plastic, a copper sleeve is located in the mould, the copper sleeve having an aperture aligned with the aperture in the mould for the injection of plastic between the sleeve and the side of the mould supporting the transducer. After the plastic is injection moulded, both the heat sink and the transducer are integrally bonded to the acousto-optic medium provided.

Yet another feature of the present invention is that the top plate of the mould may be designed to provide for fixtures in the side of the acousto-optic medium opposite the transducer such fixtures being useful for holding ancillary electronics and/or for mounting the device.

These and other features which are considered to be characteristic of this invention are set forth with particularly in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
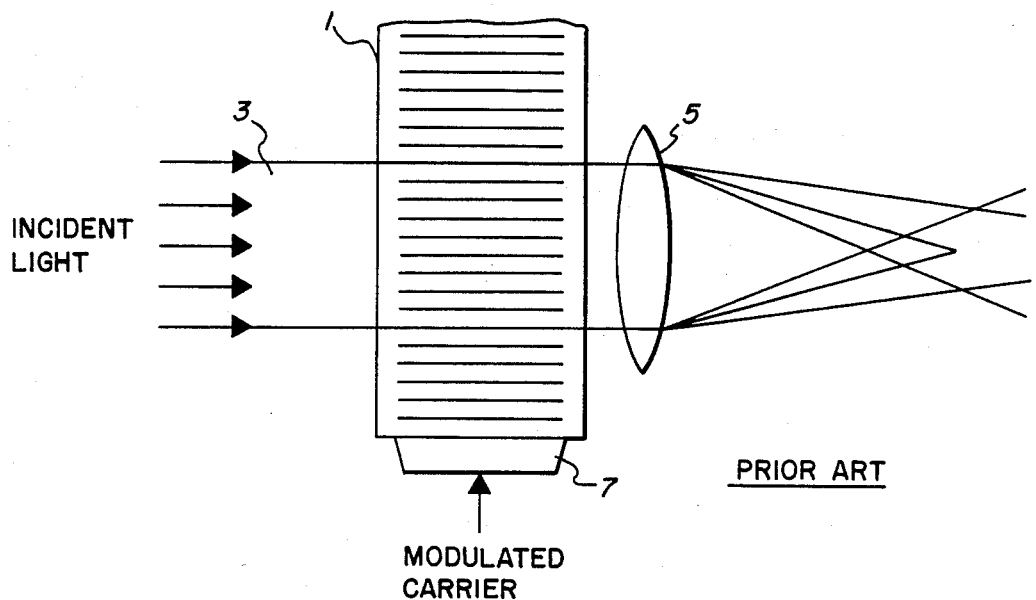
FIG. 1 is a schematic drawing of a prior art acousto-optic device.

In FIG. 1 is shown a prior art acousto-optic device which is comprised of an acousto-optic medium through which a beam 3 of incident light passes to be focused by a lens 5. The beam 3 may be a narrow, highly collimated light beam, such as could be provided by a laser. A piezoelectric transducer 7 is bonded to the medium 1 to generate an acoustic strain wave in the medium 1 when electrically driven. The acoustic strain wave modulates the refractive index of the medium 1 which diffracts the light beam 3 in a preferred direction when the light incident on the medium 1 is near the Bragg angle. In this way, the light beam 3 passing through the medium 1 is modulated by a modulated carrier, in this case an electrical signal.

Figure 2:
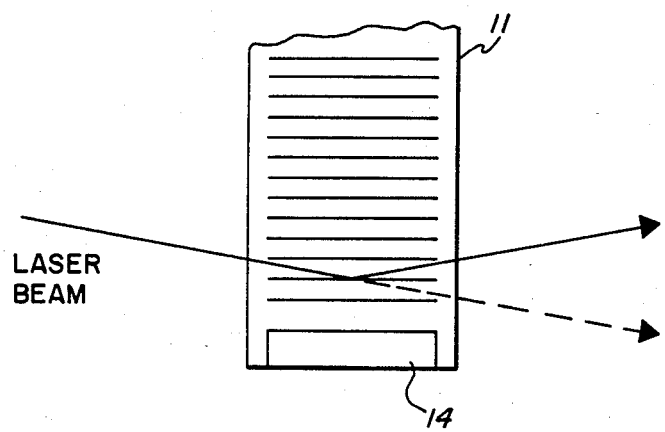
FIG. 2 is a perspective view of an acousto-optic device in accordance with the invention.

In FIG. 2, is shown an acousto-optic device in accordance with the present invention. A laser beam is incident upon the acousto-optic medium 11 which may be modulated by acoustic strain waves generated by a transducer 14, which is integral with the medium 11. The medium 11 is an interaction material comprised of an injection moulded plastic. The bonding of the transducer 14 to the medium 11 in this fashion is achieved by a particular process of fabrication.

Figure 3:
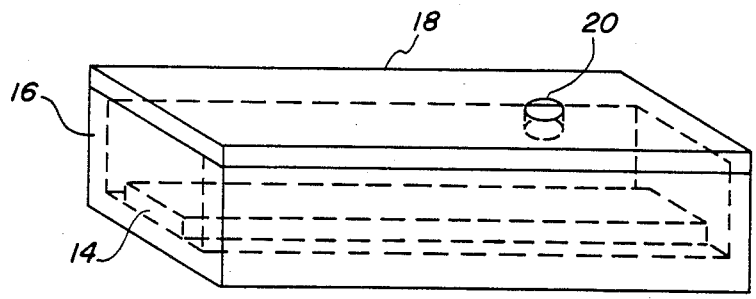
FIG. 3 is an isometric drawing of a mould containing a transducer which is used in the fabrication of an acousto-optic device of the present invention.
Figure 4:
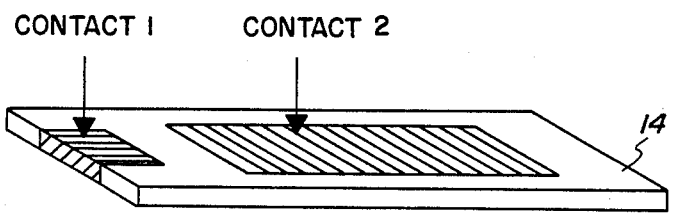
FIG. 4 is an isometric view of a transducer which is combined with the interaction material of the device in accordance with the invention.

As shown in FIG. 3, a mould 16 is provided which defines the optical configuration for the acousto-optic medium 11. The top plate 18 of the mould 16 is removed for the placement of the transducer 14 at the bottom of the mould 16 along the center of its width. The contacts 1 and 2 deposited on the transducer 14, as shown in FIG. 4, are located toward the bottom of the mould 16. An aperture 20 is located in the top plate 18 of the mould 16 through which the moulten plastic is injected into the mould 16. Upon cooling of the plastic interaction material, the transducer 14 is integrally bonded to the plastic which serves as the acousto-optic medium 11.

The optical faces of the medium 11 are provided through the moulding itself to the desired optical orientation without any lens forming steps usually required. The lenses or flat sides of the medium 11 would be its outer surfaces. Additionally, these lenses, or outer surfaces, would be automatically aligned when moulded. The inner surface of the mould plate 18 may be configured to provide fixtures in the side of the acousto-optic medium 11 opposite the transducer 14 for holding ancillary electronics and/or for mounting the acousto-optic device. The transducer 14 as shown in FIG. 4 may be made of lithium niobate, sodium potassium niobate, lithium gallate, quartz, lead-zirconatetitanate ceramic or the like. The contacts 1 and 2 provide wrap-around electrodes for receiving the electrical signals which serve as the modulated carrier. The contacts 1 and 2 are applied through conductive plating. For example, chrome or gold plating may be vapor deposited on the transducer surfaces.

Whereas prior art acousto-optic media 1 have included ferroelectric material such as lead molybdate, lead tungstate, barium sodium molybdate, and other high refractive index materials such as telluride glass, the materials which would serve as a useful medium 11 for the device of the present invention would be thermoplastics. Of course, all injection mouldable plastics could serve the requirements of the present invention. A particularly suitable material would be polysulfone, which is a rigid, strong thermoplastic that can be moulded, extruded or thermoformed into a wide variety of shapes. The heatdeflection temperature of polysulfone is 345°F at 264° p.s.i. with a long-term use temperature of 300° to 340°F. Acrylic resins, such as polymethelmethacrylate, would also provide a suitable medium 11. In practicing the invention, it would be desired that plastics with the highest melting temperature be used to minimize the effects of temperature gradients which may be caused by absorption of the acoustic waves in the medium 11 so that optical distortions would be in turn minimized.

Figure 5:
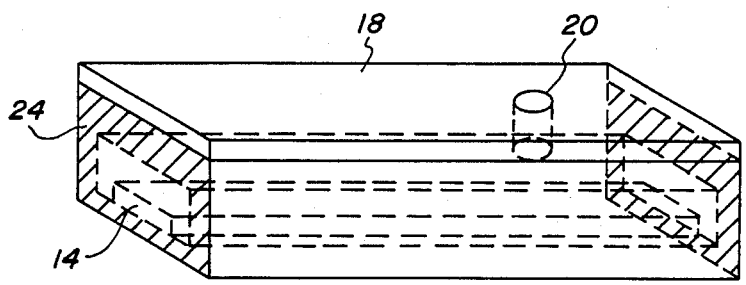
FIG. 5 is an isometric drawing of a mould containing a transducer and a heat sink.

An additional feature may also be provided in accordance with the invention. As shown in FIG. 5, a heat sink 24 may be placed in the mould 16 prior to injection of the plastic near the aperture 20. The heat sink 24 may be a copper sleeve having an aperture through its upper surface in alignment with the aperture 20 in the mould plate 18 for the injection of the interaction material. After the injection of plastic and subsequent cooling, an acousto-optic device is provided which has both a transducer 14 and a heat sink 24 integrally bonded to the acousto-optic medium 11. The mould 16 may be of any material that provides rigid boundaries, even under conditions of high temperature. Certainly, any metal used for castings would be suitable, such as copper or aluminum.

The teaching of the present invention provides an ease of fabrication of acousto-optic devices and transducer bonding to the interaction material. The use of injection moulded plastics for the interaction material would have several advantages. Material costs would be negligible, cutting or polishing operations required in the fabrication of prior art devices would no longer be necessary, and the transducer 14 and/or heat sink 24 would be bonded automatically to the interaction material during the injection process.

Obviously, many modifications of the present invention are possible in light of the above teaching. It is therefore to be understood that, in the scope of the appended claims, the invention may be practiced otherwise than as specifically described.

What is claimed is:

1. An acousto-optical light deflection device comprising:
    a plastic sound medium, and
    a piezo-electric sound transducer integrally bonded to said medium, said transducer being adapted to receive a modulated signal so as to generate acoustic waves, whereby acoustic waves transmitted to said medium form a diffraction grating for a light beam passing through said medium.

2. The device as defined in claim 1 wherein said sound medium is a thermoplastic.

3. The device as defined in claim 2 wherein said sound medium is an acrylic resin.

4. The device as defined in claim 2 wherein said sound medium is polysulfone.

5. The device as defined in claim 1 wherein is further included a heat sink coupled to said medium.

6. The device as defined in claim 5 wherein both said sound transducer and said heat sink are integrally bonded to said medium.

7. The device as defined in claim 6 wherein said sound medium is a thermoplastic.

8. The device as defined in claim 7 wherein said sound medium is an acrylic resin.

9. The device as defined in claim 7 wherein said sound medium is polysulfone.

10. A method of making an acousto-optical light deflection device comprising the steps of:
    setting a piezo-electric sound transducer in a mould with said mould having dimensions defining the configuration of the acousto-optic medium of said device, and
    injecting a heated plastic into said mould, whereby an injection moulded plastic medium is provided which conforms to the mould configuration and is integrally bonded with said transducer.

11. The method as defined in claim 10 wherein said plastic is a thermoplastic.

12. The method as defined in claim 11 wherein said thermoplastic is a polysulfone.

13. The method as defined in claim 11 wherein said thermoplastic is an acrylic resin.

14. The method as defined in claim 10 wherein is further included prior to said injecting step a step of setting a heat sink in said mould, and after said injecting step said heat sink is integrally bonded to said medium.

15. The method as defined in claim 14 wherein said plastic is a thermoplastic.

16. The method as defined in claim 15 wherein said thermoplastic is a polysulfone.

17. The method as defined in claim 15 wherein said thermoplastic is an acrylic resin.

* * * * *